(No Model.)
W. C. WILSON.
OUTLET VALVE FOR FLUID CONTAINING VESSELS.
No. 579,628. Patented Mar. 30, 1897.
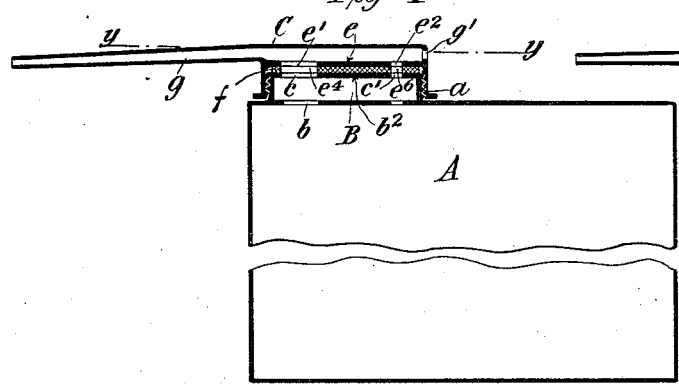
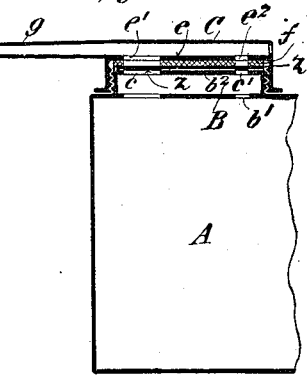
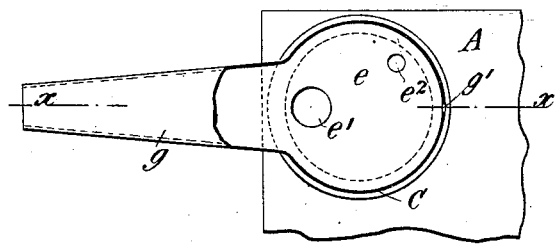
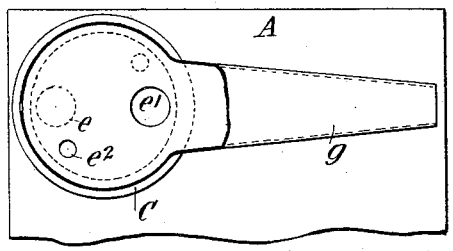
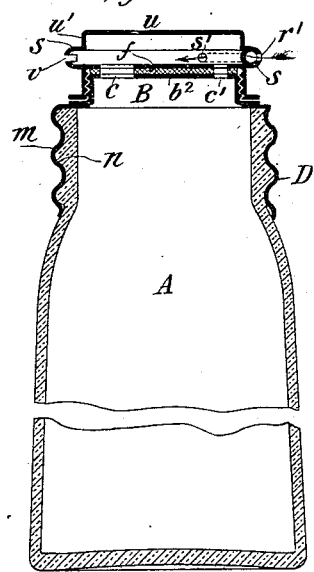
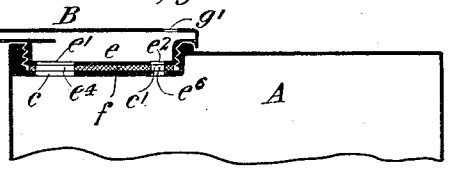
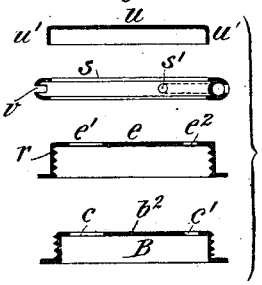
Witnesses
William C. Wilson, Inventor

UNITED STATES PATENT OFFICE.

WILLIAM C. WILSON, OF BROOKLYN, NEW YORK, ASSIGNOR TO FRANCIS RAYMOND, OF SAME PLACE.

OUTLET-VALVE FOR FLUID-CONTAINING VESSELS.

SPECIFICATION forming part of Letters Patent No. 579,628, dated March 30, 1897.

Application filed June 29, 1896. Serial No. 597,373. (No model.)

*To all whom it may concern:*

Be it known that I, WILLIAM C. WILSON, a citizen of the United States, and a resident of Brooklyn, in the county of Kings and State of New York, have invented certain new and useful Improvements in Outlet-Valves for Fluid-Containing Vessels; and I do hereby declare that the following is a full, clear, and exact description of the same, reference being had to the accompanying drawings, making a part of this specification, in which—

Figure 1 is a vertical sectional view, taken on the line $x\,x$ of Fig. 2, of an apparatus constructed according to my invention and applied to a fluid-containing vessel—as, for example, a kerosene-oil can—showing the parts in position for the outpouring of the contents of the vessel. Fig. 2 is a horizontal sectional view of the same, taken on the line $y\,y$ of Fig. 1, with the parts in the same position as in Fig. 1. Fig. 3 is a like view, but showing the parts in position to close the outlet from the vessel. Fig. 4 is a vertical sectional view of the apparatus similar to Fig. 1 with the parts in the same position, but showing a modification thereof. Fig. 5 is a vertical sectional view showing the invention as applied to a glass vessel and as inclusive of certain features additional to those shown in Figs. 1 to 4, inclusive. Fig. 6, the bracketed figure, shows in detail and separately certain parts which are conjoined for use and operation in the apparatus shown in Fig. 5. Fig. 7 is a vertical sectional view illustrating a further feature of my invention whereby a fluid-containing vessel, filled or charged with fluid and provided with said invention, may be adequately protected against exceptional rough usage and accidental injuring from the perils incident to transportation to great distances under adverse conditions and the like.

The object of this invention is to provide a superior means for the outpouring of fluids from vessels containing them and for the practically hermetical sealing or closure of said vessels when such outpouring is not immediately required. The said invention comprises certain new and useful combinations of parts whereby said objects are effectually secured.

A is the body of the fluid-containing vessel. This latter may be of any desired size, conformation, and material and adapted for holding fluid of any desired character. Thus in Figs. 1 to 4, inclusive, and in Figs. 6 and 7 the vessel is indicated as of sheet metal and of shape and proportions for holding kerosene-oil, while Fig. 5 is intended to show the invention as used on a glass bottle such as is used by druggists and many others for various purposes.

Referring first to Figs. 1 to 3, inclusive, upon any suitable part of the vessel A, preferably at the top and at or near the edge thereof—as, for instance, when the vessel is of a square form at one corner—is soldered or otherwise affixed a cap B. This cap has an external screw-thread $a$. Its interior has communication with the vessel by, for instance, one or more outlet-openings $b$ and one or more air-inlet orifices $b'$. In the top or sheet $b^2$ of this cap is an outlet-opening $c$ and an air-inlet orifice $c'$. C is a hollow shell, which has a downwardly-extended flange $d$, provided with an internal screw-thread $d'$. By means of this latter the shell C is screwed upon the cap B, with its bottom $e$ parallel with and opposite to the top $b^2$ of the cap. In said bottom is an outlet-opening $e'$ and an air-inlet orifice $e^2$. Provided to the under side of the bottom $e$ of the shell, and consequently between the said shell-bottom and the said top of the cap, is an elastic washer $f$. In this washer is an opening $e^4$, coincident to the opening $e'$ thereof, and an orifice $e^6$, coincident with the orifice $e^2$ thereof, the washer being movable with the shell. This washer may be of thin sheet india-rubber having on one or both sides a layer of thin fabric. Extended from the interior of the shell is an outlet-spout $g$, and at another part of the shell is an air-inlet orifice $g'$.

It will be observed that by turning the screw-thread of the shell upon that of the cap an axial motion is permitted to the shell and consequently a turning movement to the spout, that the outlet-openings $e\,c'$, and in like manner the air-inlet orifices $c'\,e^2$ of the cap and shell, respectively, are so proportioned and arranged as to be coincident with each other when the spout is turned to the position shown in Figs. 1 and 2, and that when the shell is in this manner brought into the described relation with the cap the bottom of the shell is moved slightly away from the top of the cap by reason of the pitch of the screw-thread. In this case the elasticity of the washer enables it to expand and occupy the slightly-increased space thus afforded between the top of the cap and the bottom of the shell.

With the parts in the position described the fluid contents of the vessel A may be readily poured out by tilting the latter to the requisite degree, the fluid passing through the several coincident outlet-openings to and through the outlet-spout $g$, while air to replace the fluid withdrawn from the vessel passes inward through the air-inlet $g'$ and the coincident air-inlet orifices of the cap, shell, and washer. As the fluid in its outward flow is caused to pass into and through the enlarged spaces or chambers constituted by the interiors of the cap and the shell, and as these are filled with air at the inception of the outflow of fluid, it follows that the stream of the latter is cushioned and made practically uniform at the same time that a slight compression of the air in such chambers tends to force the same instantaneously into the vessel to serve in some measure to impel outward the contents thereof. By this means a prompt, easy, and uniform flow without tendency to regurgitation of the liquid contents of the vessel is secured.

To hermetically close the vessel under ordinary conditions of non-use the spout $g$ is used as a handle to partially rotate the shell upon and around the cap, thereby bringing the outlet-opening $e'$ of the shell away from the corresponding outlet-opening $c$ of the cap, and in like manner bringing the air-inlet orifice $e^2$ of the shell away from the corresponding air-inlet orifice $e^6$ of the cap, as indicated in Fig. 3, in which the larger and smaller circular dotted outlines indicate, respectively, the outlet-opening and the air-inlet orifice of the cap, so that the outlet-opening and the air-inlet orifice of the shell are closed by the adjacent portion of the top $b^2$ of the cap, while in like manner the outlet-opening and air-inlet orifice of the cap are closed by the adjacent portions of the bottom $e$ of the shell, thereby shutting off all egress from and ingress to the interior of the vessel. It will be observed that when the parts are in position for outpouring of the contents of the vessel, as shown in Figs. 1 and 2, the spout $g$ may project beyond the sides of the latter for convenience of use, and in its said position indicate the fact that the outlet communications are open. In like manner when turned to close such communications, as shown in Fig. 3, the said spout is brought inward over the top of the can, not only indicating the fact of such closure, but being out of the way and bringing the apparatus with the can into compact external form.

Referring to Fig. 4, it will be seen that it differs from Figs. 1 to 3, inclusive, only in the fact that the apparatus is sunken in the top of the can to bring it more nearly flush with the upper surface of the latter. In such case the top of the cap being cut away to permit the inversion and sinking of the cap the outlet-opening $b$ and air-inlet orifice $b'$ are absent.

Referring now to Figs. 5 and 6, the cap B (shown detached and separate in Fig. 6) is secured to the mouth of the vessel A, which in this case is a glass, porcelain, or other suitable bottle. This may be done in any appropriate manner, but preferably by soldering to a screw-collar D, the thread $m$ of which screws upon a thread $n$, formed externally upon the neck of the bottle. As shown in Fig. 5, the top of the cap is over the mouth of the vessel, so that the contents of the latter may pass directly to the outlet-opening $c$ in the top of the cap. In the figures now referred to the shell C is of a peculiar structure, as follows: A flat inverted cup-shaped part $r$ is provided with an internal screw-thread by which it is screwed upon the cap B in substantially the same way that the flange $d$ of the shell C is attached to the cap in Fig. 1. Upon this part $r$, and substantially coincident with the circumference thereof, is soldered a hollow ring $s$. Upon this ring is placed a top piece $u$, which has a flange $u'$, the lower edge of which is soldered to the ring. There is thus formed a chamber within the ring $s$, the top piece $u$, and the part $r$. At one part of its circumference the inner and outer walls of the ring are cut through to provide an outlet-passage $v$ from said chamber. At another part of its circumference, in the outer wall thereof, is an air-inlet orifice $r'$, and at still another part of said circumference, but in the inner wall of the ring, is a second air-inlet orifice $s'$, so that by this means air passing inward to the interior of the shell on its way to the interior of the vessel is caused to take a circuitous course, (indicated in dotted outline in Fig. 5,) which, while sufficiently free, prevents too sudden regurgitation of the air when the contents of the vessel enters the chamber in its outward passage, and consequently tends to promote the quick entrance of air to the vessel when the outpouring begins, with the result of promoting uniformity and smoothness in the latter, as already explained. In this structure, as in the others described, the cap is provided with the outlet-opening $c$ and air-inlet orifice $c'$, and the bottom $e$ of the shell with the outlet-opening $e'$ and air-inlet opening $e^2$, arranged to operate in conjunction with each other to open and close communication by the turning of the shell with reference to the cap. In this structure, as in the others, the elastic washer is employed to secure the most effective relations of the parts during the slight variations of distance between the bottom of the shell and the top of the cap, arising from the pitch of the screw-threads when the shell is turned upon the cap.

When the outlet-openings of the bottom of the shell and the top of the cap are coincident, the fluid passes therethrough from the vessel to the outlet $v$, and the air, through the circuitous passage in the ring, enters to replace the quantity thus withdrawn from the vessel.

When—as, for example, during transportation over long distance or under especially adverse conditions—it is desired to provide additional safeguards against accidental escape of the contents of the vessel, the shell is unscrewed from the cap and there is placed upon the latter, closing its outlet-opening and air-inlet orifice, a disk $z$, of sheet metal or other suitable material, as shown in Fig. 7, and the shell being replaced is screwed snugly down, thereby holding the disk $n$ firmly upon said opening and orifice. The elastic washer $z$ being compressed upon the cap by the shell, effectually packs the joint between them. The vessel is thus hermetically closed even when, as indicated in said figure, the outlet-openings of the cap and shell happen to be coincident. Usually, however, especially when the spout $g$ is employed, the shell and cap will be in such position that the said outlet-openings and the air-inlet orifices will be non-coincident and with the spout over the top of the vessel out of the way.

What I claim as my invention is—

1. The combination with a vessel for containing fluids, of a circumferentially-threaded fixed cap, B, having an outlet-opening for the contents of the vessel and an orifice for the inlet of air to the vessel, and an axially-movable hollow screw-threaded shell screwed upon the cap, having an outlet-opening and an inlet-orifice in its bottom to coördinate with those of the cap, and with an outlet from its interior, and an air-inlet thereto, the whole arranged to permit the outflow of the contents of the vessel when the fluid-outlet opening and air-inlet orifice of the shell are brought coincident with those of the cap, and to close the vessel against such outflow when said openings and orifices are brought away from each other by the axial movement of the shell, substantially as and for the purpose herein set forth.

2. The combination with a vessel for containing fluids, of a circumferentially-threaded fixed cap, B, having an outlet-opening for the contents of the vessel and an orifice for the inlet of air to the vessel, an axially-movable hollow screw-threaded shell screwed upon the cap, having an outlet-opening and an inlet-orifice in its bottom to coördinate with those of the cap, and with an outlet from its interior, and an air-inlet thereto, the parts arranged to permit the outflow of the contents of the vessel when the fluid-outlet opening and air-inlet orifice of the shell are brought coincident with those of the cap, and to close the vessel against such outflow when said openings and orifices are brought away from each other by the axial movement of the shell, and an elastic washer interposed between the shell and the cap to compensate for variations in the distance between them by reason of the pitch of their screw-threads and provided with openings or orifices to permit the passage of fluid from and air to the vessel when those of the shell and cap are brought coincident, all substantially as and for the purpose herein set forth.

3. The combination with a vessel for containing fluids, of a circumferentially-threaded fixed cap, B, having an outlet-opening for the contents of the vessel and an orifice for the inlet of air to the vessel, an axially-movable hollow screw-threaded shell screwed upon the cap, having an outlet-opening and an inlet-orifice in its bottom to coördinate with those of the cap, an outlet-spout $g$, extended from said chamber and axially movable with the shell, and an air-inlet thereto, the whole arranged to permit the outflow of the contents of the vessel when the fluid-outlet opening and air-inlet orifice of the shell are brought coincident with those of the cap, and to close the vessel against such outflow when said openings and orifices are brought away from each other by the axial movement of the shell, substantially as and for the purpose herein set forth.

4. The combination with a vessel for containing fluids, of a circumferentially-threaded fixed cap, B, having an outlet-opening for the contents of the vessel and an orifice for the inlet of air to the vessel, an axially-movable hollow screw-threaded shell screwed upon the cap, having an outlet-opening and an inlet-orifice in its bottom to coördinate with those of the cap, an outlet-spout, $g$, extended from said chamber and axially movable with the shell, and an air-inlet thereto, the parts arranged to permit the outflow of the contents of the vessel when the fluid-outlet opening and air-inlet orifice of the shell are brought coincident with those of the cap, and to close the vessel against such outflow when said openings and orifices are brought away from each other by the axial movement of the shell, an elastic washer interposed between the shell and the cap to compensate for variations in the distance between them by reason of the pitch of their screw-threads and provided with openings or orifices to permit the passage of fluid from and air to the vessel when those of the shell and cap are brought coincident, all substantially as and for the purpose herein set forth.

5. The combination with a vessel for containing fluids, of a circumferentially-threaded fixed cap, B, having an outlet-opening for the contents of the vessel and an orifice for the inlet of air to the vessel, and an axially-movable hollow screw-threaded shell screwed upon the cap, having an outlet-opening and an inlet-orifice in its bottom to coördinate with those of the cap, and with an outlet from its said chamber, and an air-inlet thereto, the parts arranged to permit the outflow of the contents of the vessel when the fluid-outlet opening and air-inlet orifice of the shell are brought coincident with those of the cap, and to close the vessel against such outflow when said openings and orifices are brought away from each other by the axial movement of the shell, and a disk, $z$, placed between the shell and the cap to close the outlet-opening and air-inlet orifice of the cap by pressure of the shell screwed down upon the same, substantially as and for the purpose herein set forth.

6. The combination with a vessel for containing fluids, of a circumferentially-threaded fixed cap, B, having an outlet-opening for the contents of the vessel and an orifice for the inlet of air to the vessel, and an axially-movable hollow screw-threaded shell screwed upon the cap, having an outlet-opening and an inlet-orifice in its bottom to coördinate with those of the cap, and with an outlet from its said chamber, and an air-inlet thereto, the parts arranged to permit the outflow of the contents of the vessel when the fluid-outlet opening and air-inlet orifice of the shell are brought coincident with those of the cap, and to close the vessel against such outflow when said openings and orifices are brought away from each other by the axial movement of the shell, a disk, $z$, placed between the shell and the cap to close the outlet-opening and air-inlet orifice of the cap by pressure of the shell screwed down upon the same, and an elastic washer placed upon said disk to pack the joint between the shell and the cap, substantially as and for the purpose herein set forth.

7. The combination with a vessel for containing fluids and a fixed circumferentially-screw-threaded cap having an outlet-opening for the exit of the contents of the vessel, and an inlet-orifice for admitting air to said vessel, of a shell composed of a cup-shaped internally-screw-threaded part, $r$, a hollow ring, $s$, fixed upon said part and having an outlet for the contents of the vessel and an air-inlet, and a top piece, $u$, fixed to said ring the said parts being arranged to provide a chamber through which the contents of the vessel pass in the outflow of said contents and through which air passes inward to the vessel to replace the contents withdrawn therefrom, substantially as and for the purpose herein set forth.

8. The combination with a vessel for containing fluids and a fixed circumferentially-screw-threaded cap having an outlet-opening for the exit of the contents of the vessel, and an inlet-orifice for admitting air to said vessel, of a shell composed of a cup-shaped internally-screw-threaded part, $r$, a hollow ring, $s$, fixed upon said part and having an outlet for the contents of the vessel and a circuitous air-inlet passage provided by an external air-inlet at one part of the circumference of the ring, and an internal air-inlet provided at another part of said circumference and a top piece, $u$, fixed to said ring, the said parts being arranged to provide a chamber through which the contents of the vessel pass in the outflow of said contents and through which air passes inward to the vessel to replace the contents withdrawn therefrom, substantially as and for the purpose herein set forth.

WILLIAM C. WILSON.

Witnesses:
CLARENCE W. HUGHES,
JNO. C. McQUHAE.